(12) United States Patent
Liu et al.

(10) Patent No.: US 8,254,098 B2
(45) Date of Patent: Aug. 28, 2012

(54) HOUSING AND PORTABLE ELECTRONIC DEVICE USING THE SAME

(75) Inventors: Chuan-I Liu, Taipei Hsien (TW); Zhi-Min Zeng, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 246 days.

(21) Appl. No.: 12/826,819

(22) Filed: Jun. 30, 2010

(65) Prior Publication Data

US 2011/0255220 A1  Oct. 20, 2011

(30) Foreign Application Priority Data

Apr. 14, 2010 (CN) .......................... 2010 1 0146722

(51) Int. Cl.
*G06F 1/16* (2006.01)

(52) U.S. Cl. ................... 361/679.02; 174/50; 312/223.1

(58) Field of Classification Search ............. 361/679.01; 312/223.1

See application file for complete search history.

(56) References Cited

U.S. PATENT DOCUMENTS

| | | | |
|---|---|---|---|
| 3,910,448 A * | 10/1975 | Evans et al. ..................... 220/3.8 |
| 6,437,238 B1 * | 8/2002 | Annerino et al. ............... 174/50 |
| 6,574,096 B1 * | 6/2003 | Difonzo et al. .......... 361/679.27 |
| 6,847,806 B2 * | 1/2005 | Curtis et al. .................. 455/90.3 |
| 7,012,189 B2 * | 3/2006 | Kriege et al. ................. 174/377 |
| 7,209,363 B2 * | 4/2007 | Liu et al. ....................... 361/801 |
| 7,310,872 B2 * | 12/2007 | Kriege et al. ................... 29/825 |
| 7,436,653 B2 * | 10/2008 | Yang et al. ............... 361/679.01 |
| 7,636,244 B2 * | 12/2009 | Kriege et al. .................. 361/800 |
| 2002/0112870 A1 * | 8/2002 | Kobayashi et al. ............. 174/50 |
| 2005/0286214 A1 * | 12/2005 | Chen ............................. 361/681 |
| 2009/0101384 A1 * | 4/2009 | Kawasaki et al. ............ 174/50.5 |
| 2010/0061040 A1 * | 3/2010 | Dabov et al. ............ 361/679.01 |
| 2010/0061044 A1 * | 3/2010 | Zou et al. ................. 361/679.01 |
| 2011/0048755 A1 * | 3/2011 | Su et al. .......................... 174/50 |
| 2011/0050053 A1 * | 3/2011 | Deng ......................... 312/223.1 |
| 2011/0050054 A1 * | 3/2011 | Chang et al. .............. 312/223.1 |
| 2011/0255218 A1 * | 10/2011 | Pakula et al. ............ 361/679.01 |

* cited by examiner

Primary Examiner — Lisa Lea Edmonds
(74) Attorney, Agent, or Firm — Altis Law Group, Inc.

(57) ABSTRACT

A housing comprises a first section, a second section and a glue. The first section has at least one resisting block protruding therefrom, each resisting block defines a latching slot therein. The second section has at least one catch protruding therefrom, each catch corresponding to one of the latching slots, respectively. The glue is positioned between the first section and the second section for adhering the first section to the second section. When the second section is stacked on the first section via the glue, the at least one catch latch with the latching slot after the first section is pushed toward the second section.

13 Claims, 6 Drawing Sheets

HOUSING AND PORTABLE ELECTRONIC DEVICE USING THE SAME

BACKGROUND

1. Technical Field

The disclosure generally relates to housings, and particularly relates to housings used in portable electronic devices.

2. Description of Related Art

With the development of wireless communication and information processing technology, portable electronic devices, such as mobile telephones and electronic notebooks are now in widespread use. External appearance of the housing of the portable electronic device can be one of the key factors attracting consumers.

A typical way to achieve an attractive external appearance is to adher a decorative element (e.g., metal element) to the housing. However, typical decorative element can easily separate from the housing as the adhering force is usually not large enough.

Therefore, there is room for improvement within the art.

BRIEF DESCRIPTION OF THE DRAWINGS

Many aspects of the exemplary housing for portable electronic device can be better understood with reference to the following drawings. These drawings are not necessarily drawn to scale, the emphasis instead being placed upon clearly illustrating the principles of the exemplary housing and portable electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION

For illustrative purposes, the device is an electronic device such as a radiotelephone. The radiotelephone described herein is a representation of the type of wireless communication device that may benefit from the present disclosure. However, it is to be understood that the present disclosure may be applied to any type of hand-held or portable device including, but not limited to, the following devices: cordless phones, paging devices, personal digital assistants, portable computers, pen-based or keyboard-based handheld devices, remote control units, portable media players that have wireless communication capability and the like. Accordingly, any reference herein to the radiotelephone should also be considered to apply equally to other portable wireless electronic devices.

Figure 1:
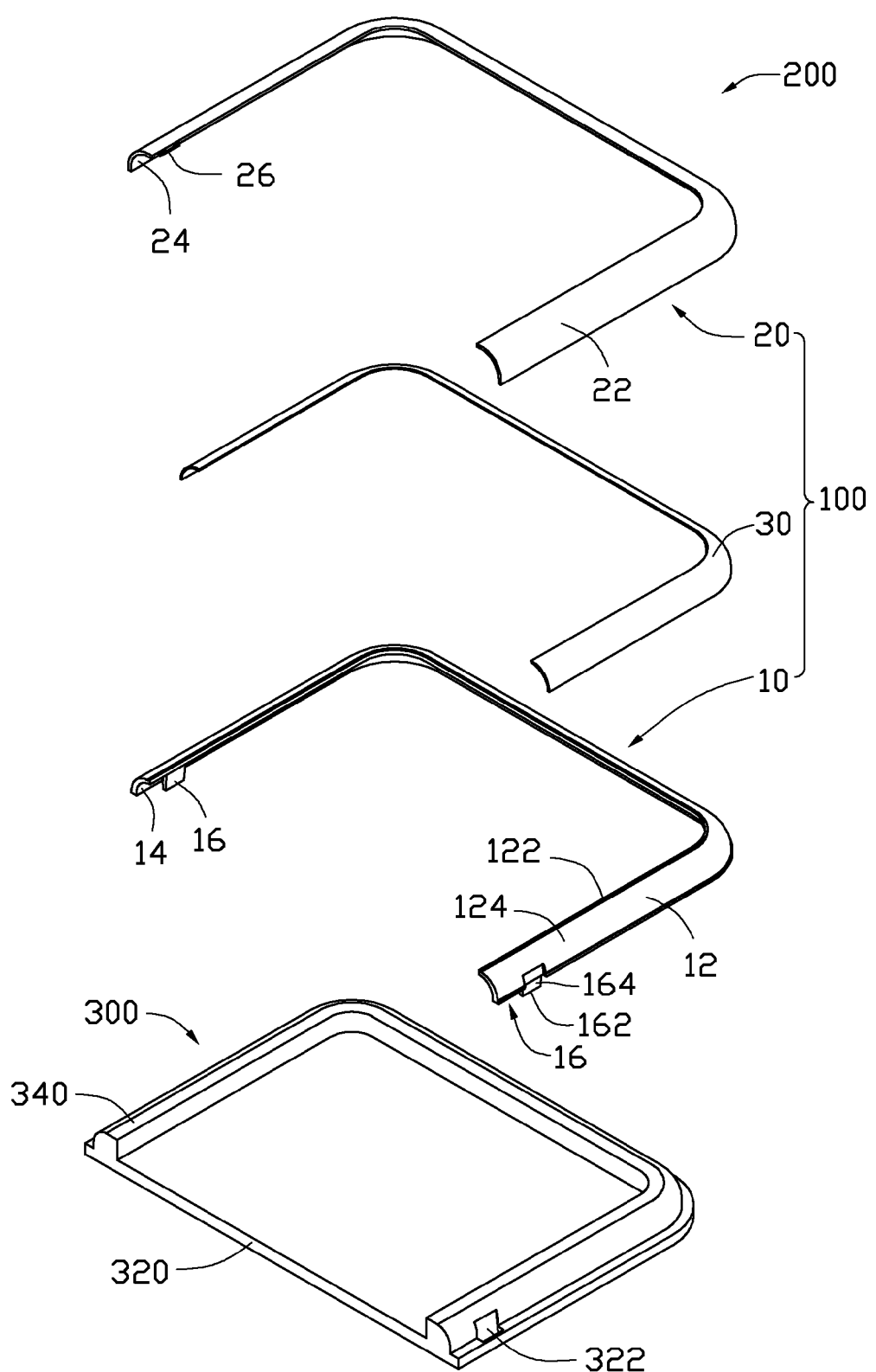
FIG. 1 is a schematic and exploded view of a portable electronic device with a housing according to an exemplary embodiment.

An exemplary embodiment of an electronic device 200 incorporating a housing 100 is shown in FIG. 1. The electronic device 200 further includes a main body 300 that latches with the housing 100. For clarification, only a portion of the electronic device 200 is shown in FIG. 1. The housing 100 includes a first section 10 and a second section 20, which are stacked together by a glue 30. In this exemplary embodiment, the first section 10 is made of plastic material, and the second section 20 is made of metallic material.

Figure 3:
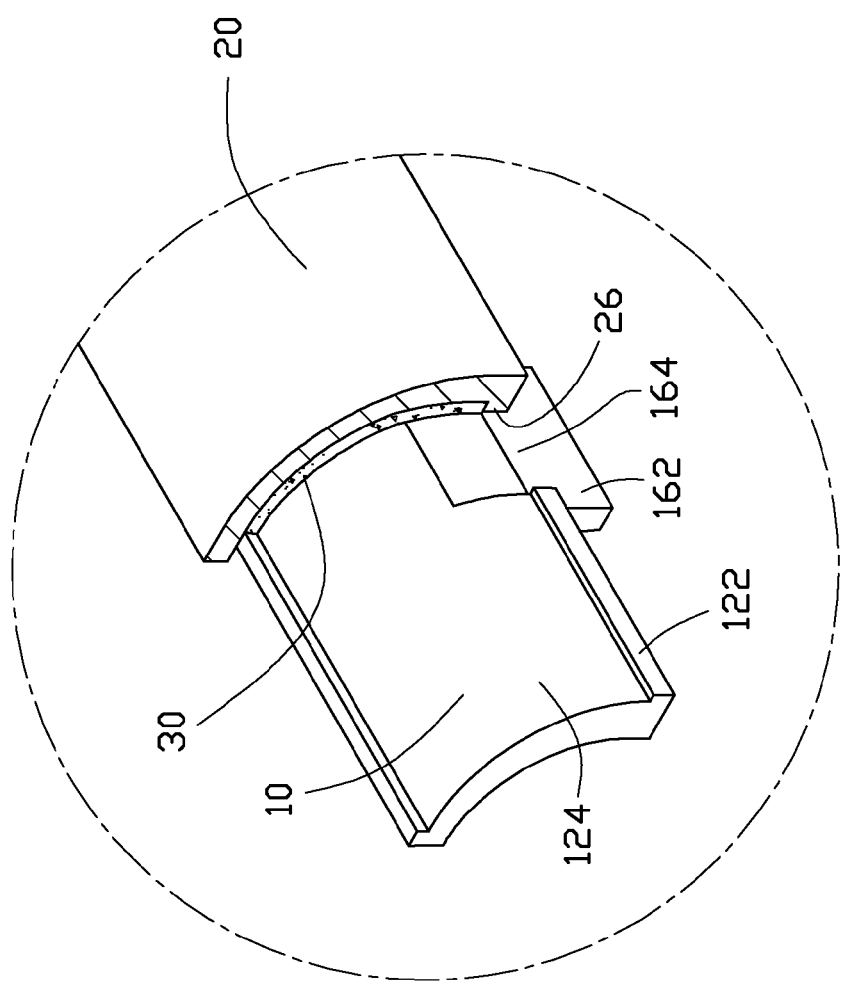
FIG. 3 is a partially enlarged view of the housing shown in FIG. 2.

The first section 10 includes an outer surface 12, an opposite inner surface 14 and a distal surface 16 connecting the outer surface 12 to the inner surface 14. The first section 10 has two opposite resisting blocks 162 protruding from the distal surface 16 and located near the inner surface 14. Each resisting block 162 has a latching slot 164 recessed from a side thereof facing the outer surface 12. The latching slots 164 are used for latching with the second section 20. Referring to FIG. 3, the first section 10 further has two flanges 122 spaced apart and protruding from the outer surface 12, thereby defining a receiving slot 124 between the flanges 122 for accommodating the glue 30 therein.

The second section 20 has substantially the same shape and size as the first section 10. The second section 20 has an outer wall 22 and an opposite inner wall 24. The second section 20 has two catches 26 protruding from the inner wall 24. Each catch corresponds to one of the latching slots 164. Therefore, each catch 26 latches with one of the latching slots 164, respectively.

The main body 300 includes a planar wall 320 and a sidewall 340 protruding from the planar wall 320. The main body 300 has two troughs 322 defined therein for accommodating the resisting blocks 162. The sidewall 340 is used for pushing the resisting blocks 162 toward the second section 20 so the latching slots 164 latch with the catches 26.

Figure 2:
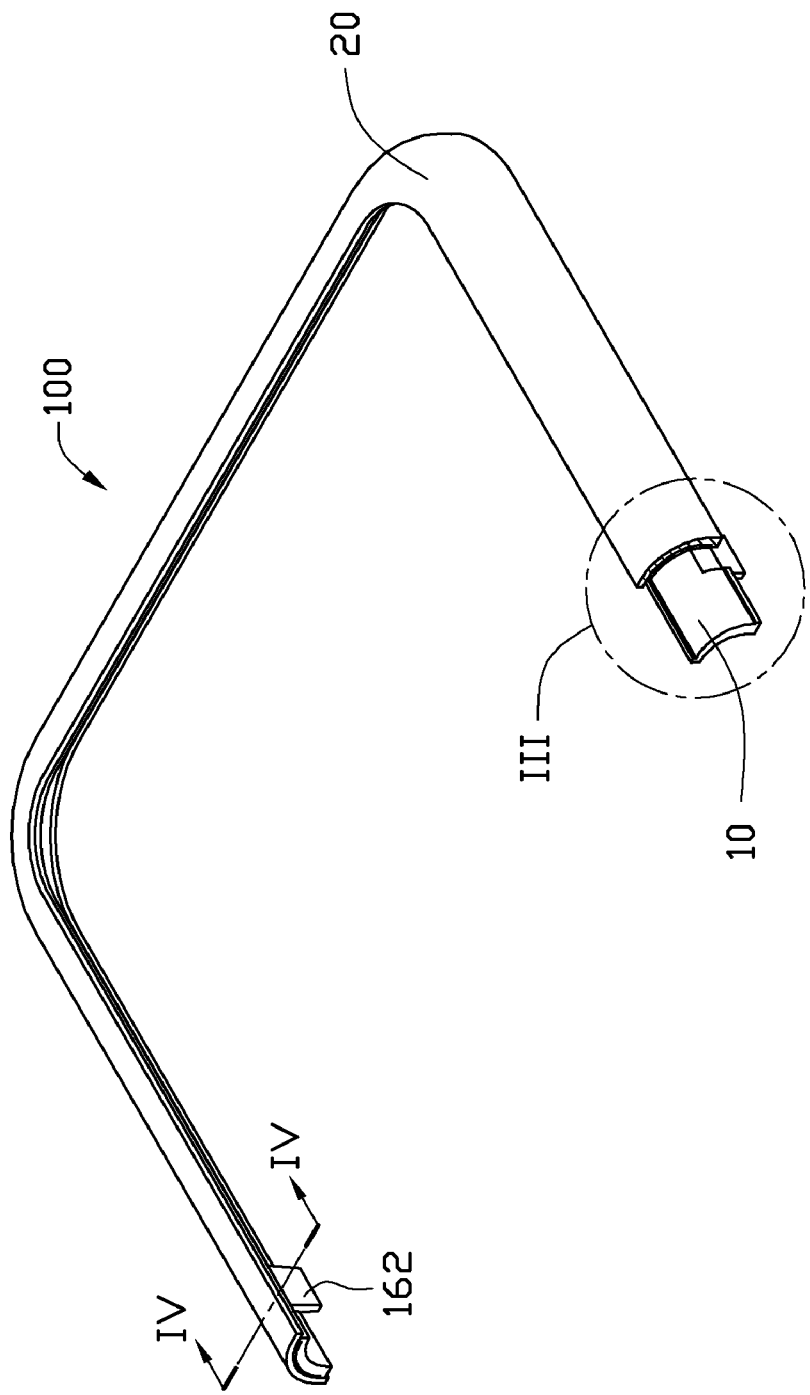
FIG. 2 is a cut-away and assembled view of the housing shown in FIG. 1.
Figure 4:
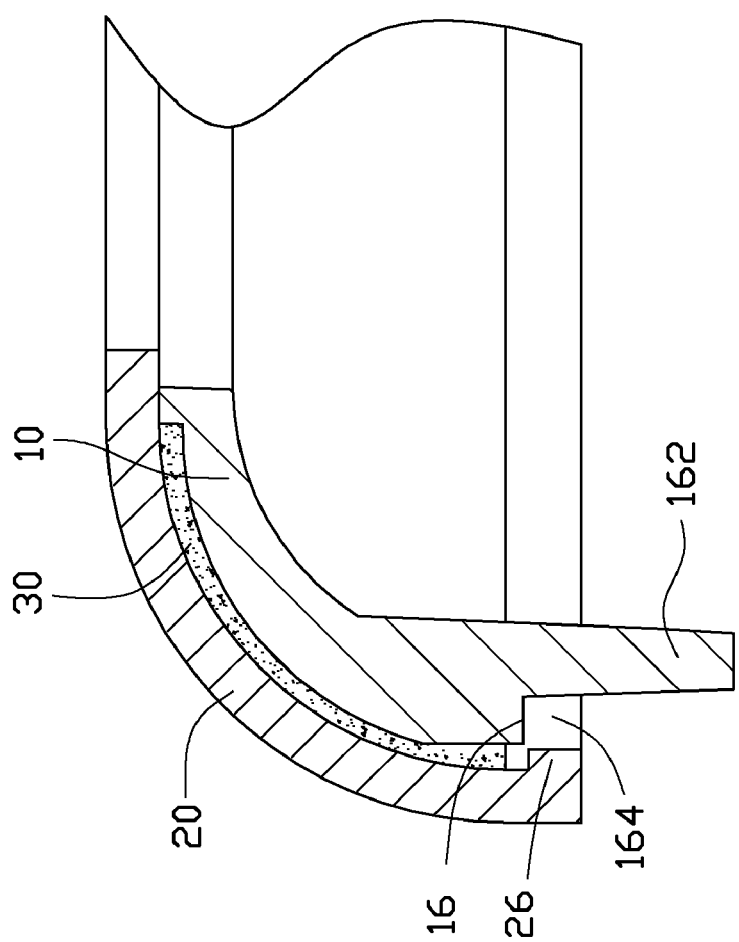
FIG. 4 is a cross-sectional view of the housing shown in FIG. 2 along the line of IV-IV.
Figure 5:
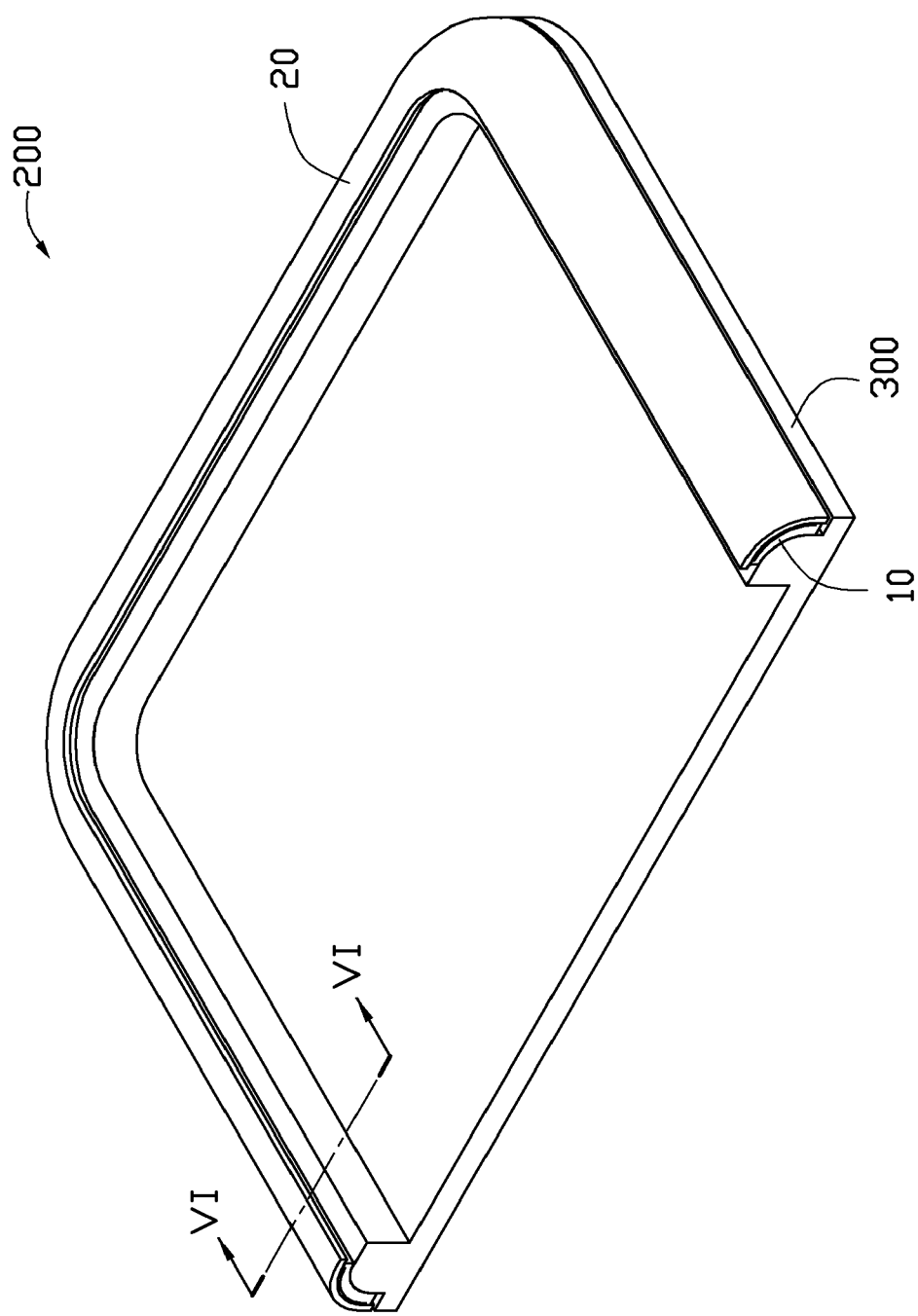
FIG. 5 is an assembled view of the portable electronic device shown in FIG. 1.
Figure 6:
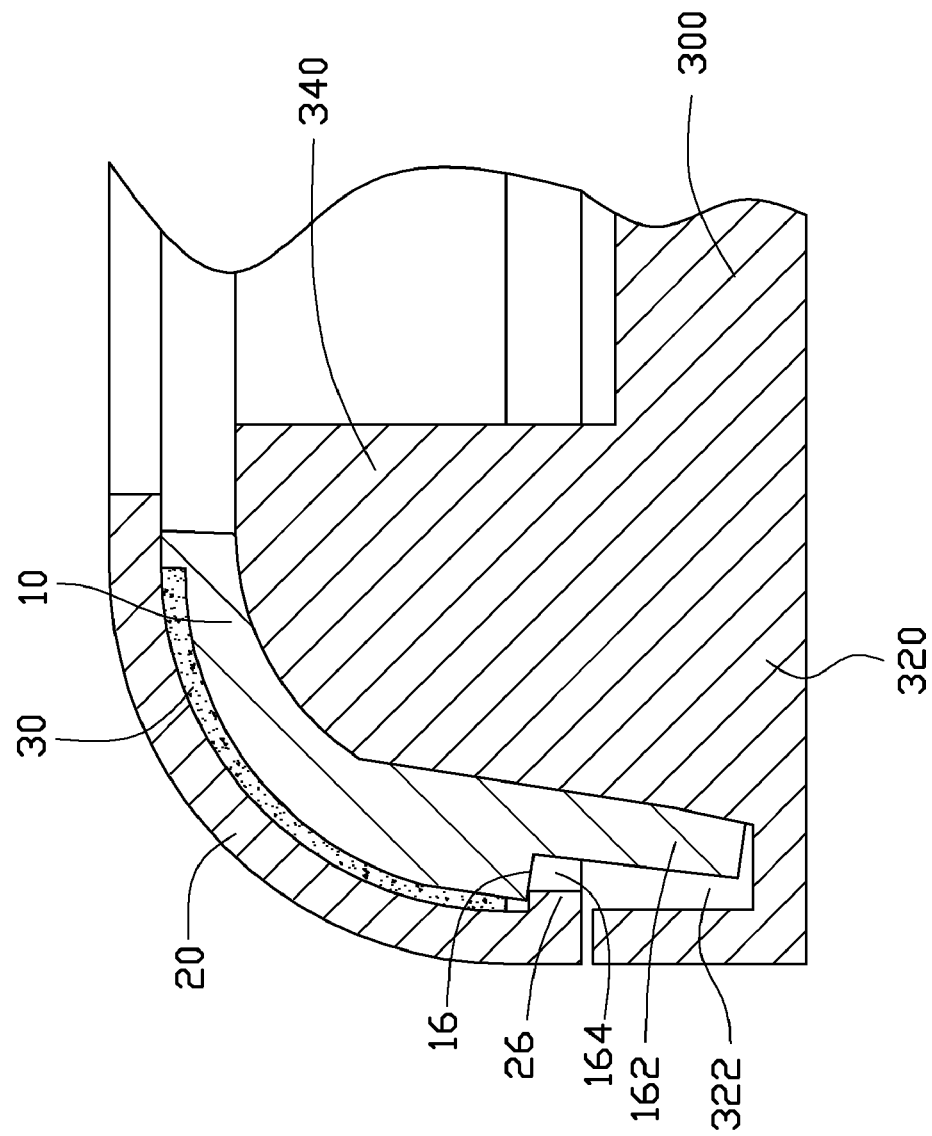
FIG. 6 is a cross-sectional view of the portable electronic device shown in FIG. 5 along the line of VI-VI.

Referring to FIGS. 2-3, in assembly, the glue 30 is attached on the inner wall 24 of the second section 20. The second section 20 is stacked on the first section 10 by the adhesive force of the glue 30, and the glue 30 is accommodated in the receiving slot 124 of the first section 10. Referring to FIG. 4, the catches 26 are not latched with the latching slots 164 and there is a gap between the catches 26 and the latching slots 164 when the second section 20 stacks on the first section 10 via the glue 30 to yield the housing 100. Referring to FIGS. 5 and 6, the resisting blocks 162 are then aligned with the troughs 322. The housing 100 is pushed toward the main body 300. At this stage, the resisting blocks 162 are received in the troughs 322, and the sidewall 340 of the main body 300 pushes the resisting blocks 162 toward the catches 26 until the latching slots 164 latch with the catches 26. Thus, the second section 20 can be firmly stacked on the first section 10 as the catches 26 latch with the latching slots 164.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A housing, comprising:
   a first section having at least one resisting block protruding therefrom, each resisting block defining a latching slot therein;
   a second section having at least one catch protruding therefrom, each catch corresponding to one of the latching slots, respectively; and a glue positioned between the first section and the second section for adhering the first section to the second section;

wherein the first section has two flanges spaced apart and protruding from a surface thereof facing the second section, the glue is positioned between the flanges, when the second section is stacked on the first section via the glue, the at least one catch latches with the latching slot after the first section is pushed toward the second section.

2. The housing as claimed in claim 1, wherein a receiving slot is defined between the flanges; the receiving slot is for accommodating the glue therein.

3. The housing as claimed in claim 1, wherein a gap is formed between the catches and the latching slots when the second section is stacked on the first section via the glue and before the second section is pushed and bent toward the first section.

4. An electronic device, comprising:
a main body; and
a housing mounted to main body, the housing comprising:
   a first section having at least one resisting block protruding therefrom and assembled to the main body;
   a second section stacked on the first section, the second section having at least one catch protruding therefrom, each catch corresponding to one of the resisting blocks, respectively; and
   a glue positioned between the first section and the second section for adhering the first section to the second section;
wherein when the second section is stacked on the first section via the glue, a gap is formed between each catch and one corresponding resisting block before the first section is mounted to the main body; and the at least one catch latch with the at least one resisting block after the first section is mounted to the main body.

5. The electronic device as claimed in claim 4, wherein each resisting block has a latching slot defined therein, each catch latches with one corresponding latching slot after the first section is mounted to the main body.

6. The electronic device as claimed in claim 4, wherein the first section has two flanges spaced apart and protruding from a surface thereof facing the second section, the glue is positioned between the flanges.

7. The electronic device as claimed in claim 4, wherein a receiving slot is defined between the flanges; the receiving slot is for accommodating the glue therein.

8. The electronic device as claimed in claim 4, wherein the main body include a planar wall and a sidewall protruding from the planar wall, the planar wall defines at least one trough for accommodating each resisting block.

9. The electronic device as claimed in claim 8, wherein when mounting the first section to the main body, the resisting block is received in the trough such that the side wall pushes the resisting block toward the catch and latch with the catch.

10. An electronic device, comprising:
a main body; and
a housing mounted to main body, the housing comprising:
   a first section having at least one resisting block protruding therefrom, each resisting block defining a latching slot therein;
   a second section having at least one catch protruding therefrom, each catch corresponding to one of the latching slots, respectively; and
   a glue positioned between the first section and the second section for adhering the first section to the second section;
wherein when the second section is stacked on the first section via the glue, the at least one catch latch with the latching slot after the first section is pushed toward the second section.

11. The electronic device as claimed in claim 10, wherein the first section has two flanges spaced apart and protruding from a surface thereof facing the second section, the glue is positioned between the flanges.

12. The electronic device as claimed in claim 11, wherein a receiving slot is defined between the flanges; the receiving slot is for accommodating the glue therein.

13. The electronic device as claimed in claim 10, wherein a gap is formed between the catches and the latching slots when the second section is stacked on the first section via the glue and before the second section is pushed and bent toward the first section.

* * * * *